(12) United States Patent
Geaney

(10) Patent No.: US 9,103,596 B1
(45) Date of Patent: Aug. 11, 2015

(54) EVAPORATIVE COOLER REGULATION SYSTEM AND METHOD

(71) Applicant: Jeremiah J. Geaney, Klamath Falls, OR (US)

(72) Inventor: Jeremiah J. Geaney, Klamath Falls, OR (US)

(*) Notice: Subject to any disclaimer, the term of this patent is extended or adjusted under 35 U.S.C. 154(b) by 250 days.

(21) Appl. No.: 13/968,725

(22) Filed: Aug. 16, 2013

(51) Int. Cl.
 *F28C 1/00* (2006.01)
 *F28C 3/08* (2006.01)

(52) U.S. Cl.
 CPC .................................. *F28C 3/08* (2013.01)

(58) Field of Classification Search
 CPC ............ F28C 1/00; F24F 5/0035; F24F 6/02; F24F 7/00; F24F 7/007
 USPC ............................................ 62/121, 525, 426
 See application file for complete search history.

(56) References Cited

U.S. PATENT DOCUMENTS

| 2,824,575 | A | | 2/1958 | Rosen |
| 2,960,924 | A | | 11/1960 | Grott |
| 3,357,088 | A | | 12/1967 | Hoffman et al. |
| 4,020,753 | A | | 5/1977 | Efstratis |
| 4,172,494 | A | | 10/1979 | Saulters |
| 4,315,457 | A | | 2/1982 | Lang et al. |
| 4,335,647 | A | * | 6/1982 | Timmons ...................... 454/300 |
| 4,362,091 | A | * | 12/1982 | Cox ............................... 454/306 |
| 4,732,012 | A | * | 3/1988 | Thorpe ........................... 62/304 |
| 4,737,103 | A | * | 4/1988 | Siccardi ......................... 432/222 |
| 5,409,266 | A | * | 4/1995 | Baker ............................. 285/44 |
| 5,655,963 | A | | 8/1997 | Paschke et al. |
| 6,117,005 | A | | 9/2000 | Weiss |
| 6,241,603 | B1 | * | 6/2001 | Watson ......................... 454/284 |
| 7,334,420 | B1 | * | 2/2008 | Garris ......................... 62/259.1 |
| 2005/0054282 | A1 | * | 3/2005 | Green et al. .................. 454/201 |
| 2006/0105697 | A1 | * | 5/2006 | Aronstam et al. ............. 454/256 |

* cited by examiner

*Primary Examiner* — Cheryl J Tyler
*Assistant Examiner* — David Teitelbaum
(74) *Attorney, Agent, or Firm* — Jerry Haynes Law

(57) ABSTRACT

An evaporative cooler regulation system and method provides adaptable connectors and directional dispersion components that couple to an evaporative cooler and tubes for distribution and directional dispersion of a fluid, such as evaporated air. The evaporative cooler system also provides at least one aperture that facilitates external access to the controls of the evaporative cooler. In this manner, the evaporative cooler and the resultant fluid may be regulated externally. The fluid is further regulated by expanding and interchanging the number of distribution tubes that carry the fluid. A hood attaches to the evaporative cooler, forming a seal. The hood comprises apertures for accessing controls and also for dispersing the fluid. A tube coupler joins the hood and a tube. The tube disperses the fluid through an attached dispersion grill. The dispersion grill pivots to directionally disperse the fluid. A series of tubes extend the range of the system.

1 Claim, 3 Drawing Sheets

EVAPORATIVE COOLER REGULATION SYSTEM AND METHOD

FIELD OF THE INVENTION

Figure 1:
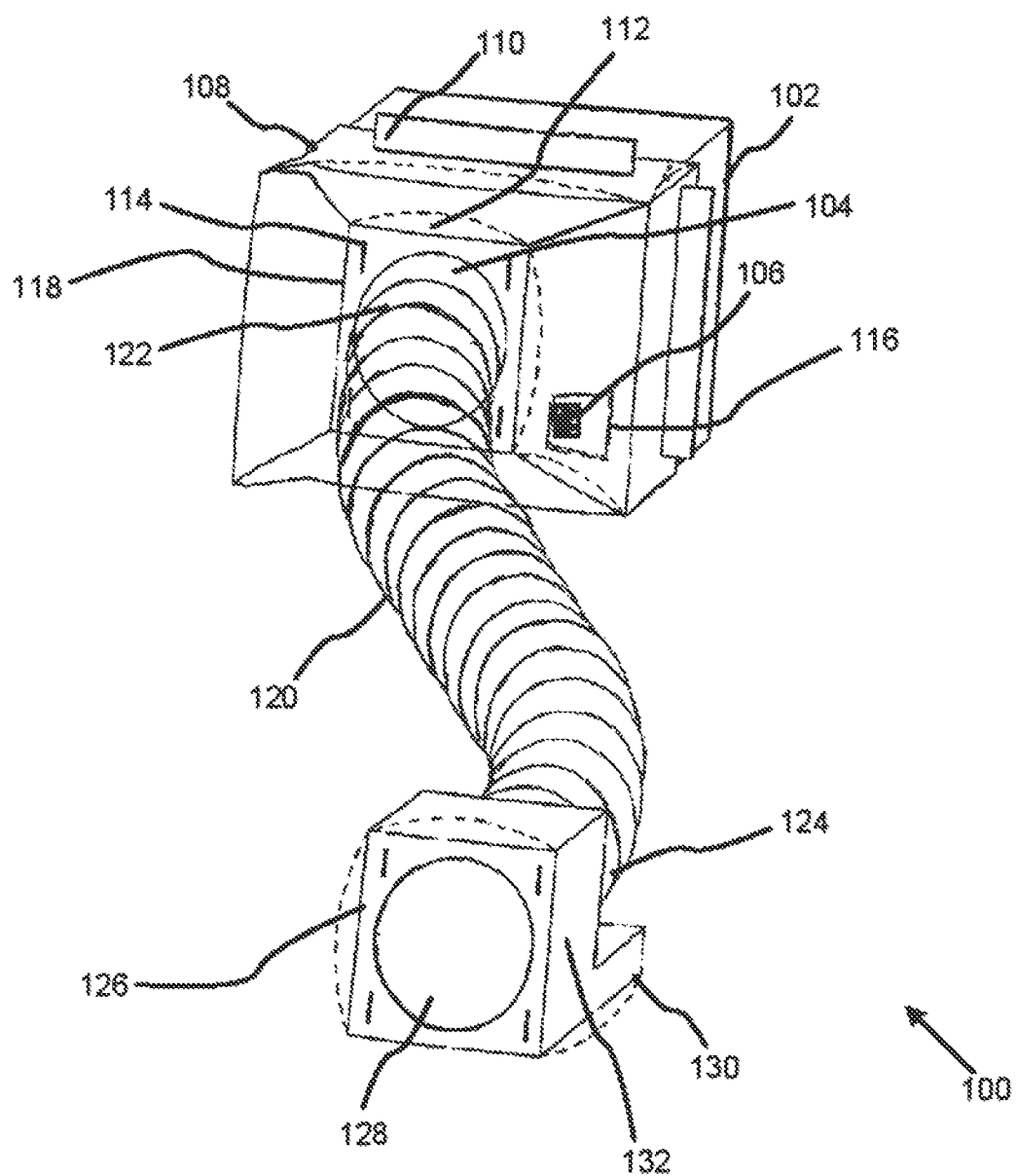

The present invention relates generally to an evaporative cooler regulation system and method. More so, the evaporative cooler regulation system and method provides adaptable connectors and dispersion components that couple to an evaporative cooler and at least one tube for distribution and directional dispersion of a fluid.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

An evaporative cooler is a device that cools air through the evaporation of water. Evaporative cooling differs from typical air conditioning systems which use vapor-compression or absorption refrigeration cycles. Often, evaporative cooling works by employing water's large enthalpy of vaporization. The temperature of dry air can be dropped significantly through the phase transition of liquid water to water vapor, which can cool air using much less energy than refrigeration.

Often, in extremely dry climates, evaporative cooling of air has the added benefit of conditioning the air with more moisture for the comfort of building occupants. Unlike closed-cycle refrigeration, evaporative cooling requires a water source, and must continually consume water to operate.

It is known that in less arid areas, the resultant can be excessively humid air that counteracts the purpose of the evaporative cooler, which is to cool an area. The evaporative cooler, however, may be regulated to help minimize excessive humidity formation. Factors such as fan speed, temperature, and water consumption can help regulate the function of an evaporative cooler.

In many instances, duct tubing is used in heating, ventilation, and air conditioning to deliver and remove air. These needed airflows include, for example, supply air, return air, and exhaust air. Duct tubing also delivers, most commonly as part of the supply air, ventilation air. As such, air ducts are one method of ensuring acceptable indoor air quality as well as thermal comfort.

Often, a series of ducts can be joined to extend the range of air distribution. The duct tubes can then terminate at an exhaust for dispersion into a room. The exhaust can be in a room separate from the initiating cooling or heating device.

Even though the above cited evaporative cooler regulation system and method addresses some of the needs of the market, however, a directional fluid regulation system that couples to, directionally distributes, and allows access to controls on an evaporative cooler is still needed.

SUMMARY OF THE INVENTION

In one embodiment of the present invention, an evaporative cooler regulation system provides adaptable connectors and directional dispersion components that couple to an evaporative cooler and at least one tube for distribution and directional dispersion of a fluid, such as evaporated air. The evaporative cooler system also provides at least one aperture that facilitates external access to the controls of the evaporative cooler. In this manner, the evaporative cooler and the resultant fluid may be regulated externally. The fluid may further be regulated by expanding and interchanging the number of distribution tubes that carry the fluid. Those skilled in the art, in light of the present teachings, will recognize that an evaporative cooler utilizes water's latent heat of evaporation to cool the ambient air. Outside of dry regions, the evaporated air may cause uncomfortable humidity in a closed room. By better regulating factors, such as fluid velocity, fluid direction, and fluid temperature, the system may help minimize potential drawbacks of the evaporative cooler.

In some embodiments, the evaporative cooler regulation system comprises adaptable connectors and tubes that couple to the evaporative cooler. The evaporative cooler may include, without limitation, an evaporative cooler, a wet air cooler, a swamp cooler, a desert cooler, an evaporative cooler tower, and a mist system. The system couples to the evaporative cooler for regulating it and distributing the expelled fluid. The system includes apertures that provide access to controls on the evaporative cooler. The system utilizes at least one tube for carrying the fluid, with the capacity to expand to a multiplicity of flexible tubes to increase the dispersion range. The number and diameters of the at least one tube may be expanded due to connectors between the tubes. The system directionally disperses the fluid through a plurality of axial slots, or grills, which may be oriented in a desired direction.

In one embodiment, a hood portion engages a discharge opening of the evaporative cooler. The hood portion is adaptable to provide a custom fit to an eclectic assortment of evaporative coolers. The hood portion also provides numerous functions for the evaporative cooler regulation system. In some embodiments, the hood portion comprises a hood mounting end that forms a seal with the discharge opening of the evaporative cooler. The seal helps restrict fluid loss at the junction between the surfaces. The hood portion comprises at least one flange for attaching to the evaporative cooler. The at least one flange is configured to at least partially enter slots in the discharge opening of the evaporative cooler, thereby forming the seal. The hood portion further comprises at least one aperture for regulating access to the evaporative cooler, evaporative cooler controls, and the fluid. The at least one aperture may be sufficiently sized and dimensioned to allow a user to access and manipulate regulations on the evaporative cooler. The at least one aperture may further allow for simple maintenance of the evaporative cooler without having to detach the hood portion. Additionally, the at least one aperture may be configured to close and open through a sliding barrier. The at least one aperture may then be operable to at least partially allow the fluid to disperse for cooling the ambient air. In this manner, the fluid may disperse in proximity to the evaporative cooler. The hood portion may further include a hood output end for attaching to other components so that the system may be expanded further.

The hood output end joins with a tube coupling portion, which is sized and dimensioned to couple to the at least one tube. The coupling portion may have a flat surface and a substantially similar diameter to the hood output end. The coupling portion comprises at least one tab. The at least one tab is configured to at least partially enter at least one slot in the hood output end to form a secure attachment between them. The ends of the coupling portion may not be sized the same, as the coupling portion may serve as an adapter between differently sized circumferences of the hood output end and the at least one tube.

At least one tube joins with the coupling portion. The at least one tube may include, without limitation, a flexible aluminum duct tube, an air conditioner duct, a polyvinyl chloride (PVC) pipe, and a pipe, tube, or canal that carries air or liquid from one place to another. The at least one tube includes a proximal end for attaching to the tube coupling portion. The at least one tube may include a 10" diameter configured to join and form a seal with the tube coupling portion. The at least one tube may utilize a plurality of tubes joined together, and tapering into a gradually decreasing diameter. In this manner, the speed of the fluid is increased. The flexible construction of the at least one tube allows for fluid distribution to be regulated more efficiently. For example, without limitation, the fluid may be directed towards a first room during the morning and a second room during the evening. An insulator may position between the at least one tube and the tube coupling portion to help restrict the loss of cool fluid from the junction. The at least one tube may be supplied by the user or be obtained off the shelf, since the system is adaptable to join with an eclectic sizes and styles of tubes and evaporation cooling devices. The at least one tube further includes a distal end for either dispersing the fluid, or joining with additional components.

In some embodiments, a dispersion portion couples to the distal end of the at least one tube. The dispersion portion serves to directionally disperse the fluid and additionally, couple two tubes together, if required. The dispersion portion includes a substantially L-shape that forms a rigid, terminal end for the distal end of the tube. The substantially L-shape comprises a longitudinal portion that positions along the longitudinal axis of the at least one tube, and an end portion that rests across the face of the distal end. A flange extends form the end portion. The flange can be circular and sized to mate with the distal end to form a fluid-tight seal. The dispersion portion further comprises a dispersion grill for directionally dispersing the fluid. The dispersion grill pivotally adjusts to direct the fluid towards multiple directions along a cross section of the distal end. The dispersion portion further comprises at least one attachment slot that is configured to receive and secure to an additional tube coupling portion and tube. In this manner, a series of tubes can join together to extend the distribution range of the system.

A first aspect of the present invention provides an evaporative cooler regulation system for regulating and distributing a fluid from an evaporative cooler, the evaporative cooler regulation system comprising:

a hood portion for attaching to the evaporative cooler, the hood portion comprising at least one aperture, the at least one aperture being configured to enable access to a cooler control portion, the cooler control portion being operable to regulate the fluid dispersion, the at least one aperture further being configured to enable at least partial passage of the fluid, the hood portion further comprising a hood output end;

a tube coupling portion for coupling the hood portion to at least one tube, the tube coupling portion being adjustable to join with differently sized and dimensioned tubes; and a dispersion portion for dispersing the fluid, the dispersion portion comprising a dispersion grill for directionally funneling the fluid during dispersion, the dispersion portion further comprising a dispersion tube end for attaching to a distal end of the at least one tube, the dispersion portion further comprising a dispersion coupling end for attaching to at least one additional tube coupling portion and at least one additional tube, the additional attachments being operable to expand a range of the evaporative cooler regulation system.

In a second aspect, the hood portion comprises at least one aperture for accessing the cooler control portion. The cooler control portion may include, without limitation, a power regulator, a temperature regulator, and a fan speed regulator. The at least one aperture is configured to switch between an open position and a closed position to enable access to the cooler control portion.

In another aspect, the at least one aperture is configured to enable at least partial passage of the fluid. This allows the fluid to disperse in proximity to the evaporative cooler, in the first area. Conversely, the fluid that disperses from the dispersion portion may disperse at a distal point form the evaporative cooler, at a second area.

Figure 3:
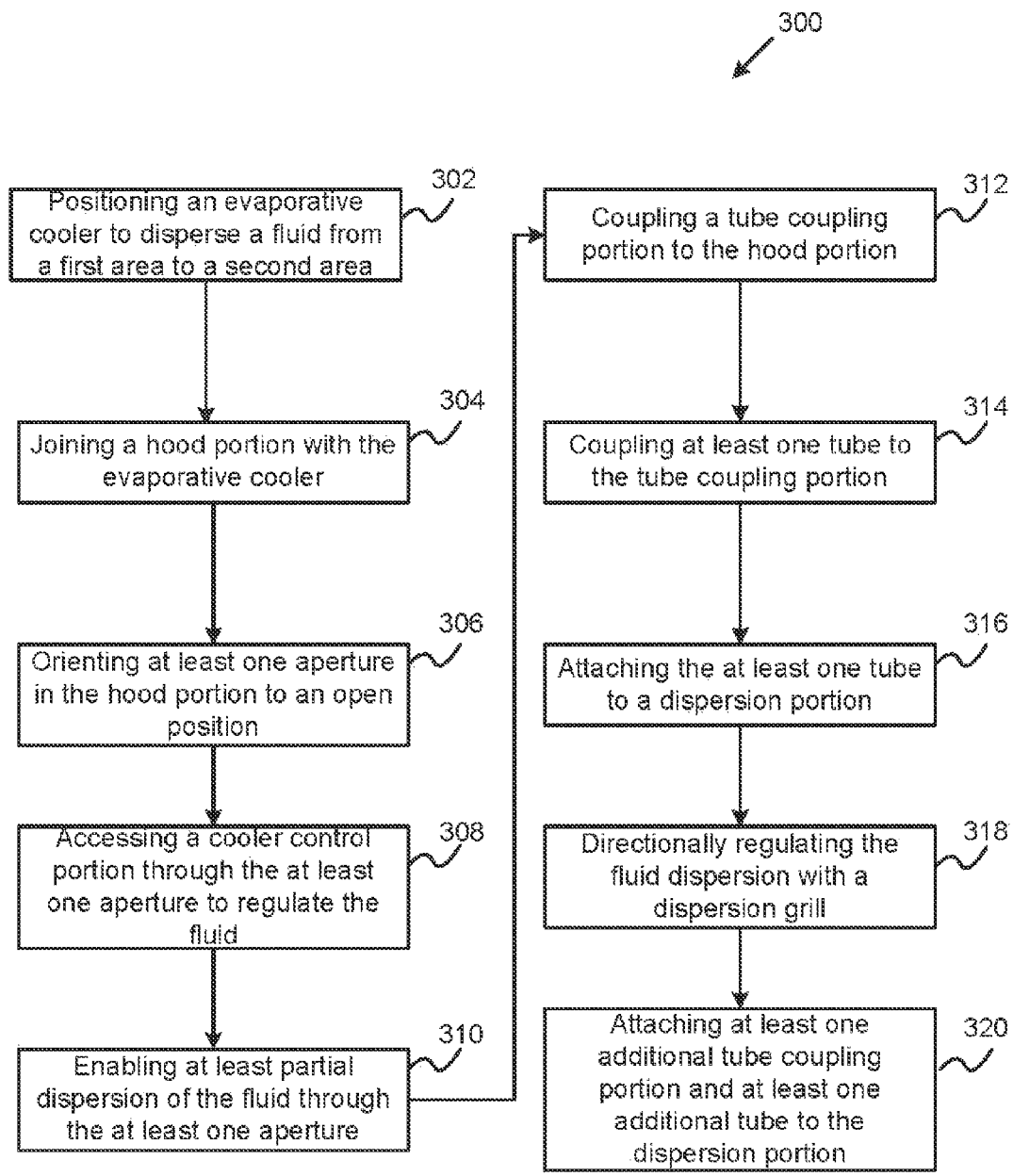

In yet another aspect, the tube coupling portion couples to the hood portion with at least one tab that at least partially enters at least one slot in the hood output end. The at least one slot may be sized and dimensioned to lock the at least one tab into a secure attachment for sealing the tube coupling portion with the hood portion.

In yet another aspect, the dispersion grill pivots to regulate the directional flow of the fluid.

In another aspect, the dispersion portion serves to initiate a series of tubes by mating with a tube coupling portion, which then attaches to a tube. The series of tube coupling portions and tubes can then perpetually continue to extend the range of the evaporative cooler regulation system.

In another aspect, a series of tubes in the system can be progressively increased or decreased in diameter to slow down or increase the fluid flow. The tube coupling portion is adjustable to couple to different tube diameters.

One objective of the present invention is to more efficiently regulate moist, cool air that disperses from the evaporative cooler. The moist, cool air may increase the humidity such that the ambient air is not cooled sufficiently and therefore uncomfortable to a user. Therefore, regulating fluid factors such as fan speed and temperature from a first area creates a desired ambient temperature in both the first area and the second area.

Another objective is to regulate and carry the fluid from a first area to a second area to enhance the ambient air. The first area and the second area may comprise separate rooms or even separate buildings.

Another objective is to regulate the cooler control portion from the first area to directly affect the fluid dispersion in the second area. However, the fluid may also disperse into the first area through the at least one aperture in the hood portion.

Yet another objective is to assemble the evaporative cooler regulation system without the use of tools, since the system is modular.

Yet another objective is to manufacture the components of the system with a variety of materials, including, without limitation, wood, rigid polymers, cardboard, and fiberglass.

Another objective is that each component of the system can be packages separately or as a unit for distribution.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which:

FIG. 1 illustrates a detailed perspective view of an exemplary evaporative cooler regulation system, in accordance with an embodiment of the present invention;

FIGS. 2A and 2B illustrate side views of exemplary evaporative cooler regulation system, where FIG. 2A illustrates the dispersion portion detached from the tube, and FIG. 2B illustrates the dispersion portion joined with the tube, in accordance with an embodiment of the present invention; and FIG. 3 illustrates a flowchart diagram of an exemplary evaporative cooler regulation method, in accordance with an embodiment of the present invention.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 2A:
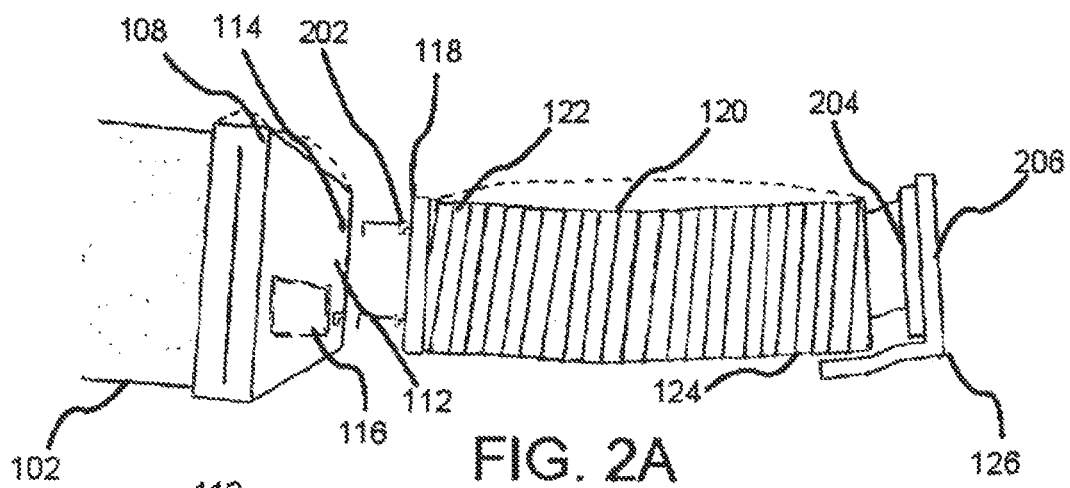
Figure 2B:
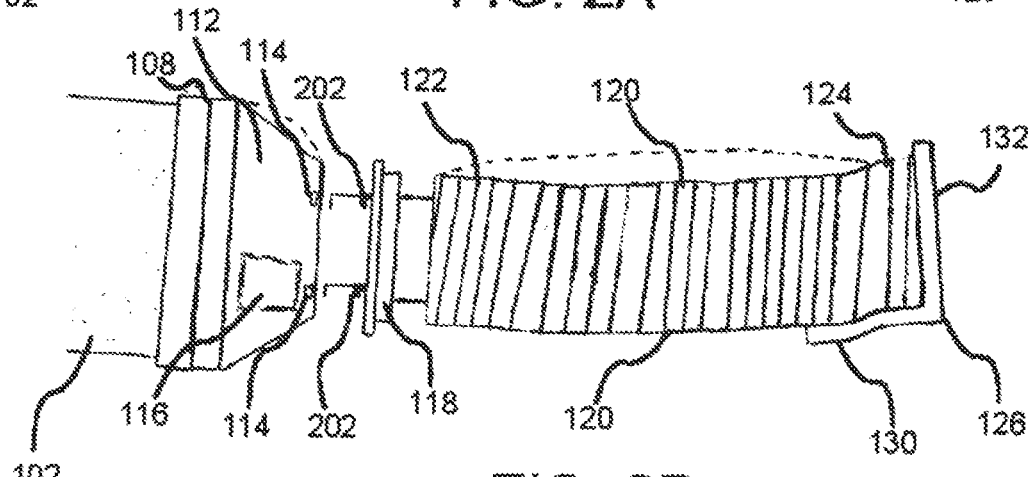

An evaporative cooler regulation system 100 is described in FIGS. 1 through 2B. The evaporative cooler regulation system 100 is an assembly comprising:
a hood portion 108 for attaching to the evaporative cooler 102, the hood portion 108 comprising at least one aperture 116, the at least one aperture 116 being configured to enable access to a cooler control portion 106, the cooler control portion 106 being operable to regulate the fluid dispersion, the at least one aperture 116 further being configured to enable at least partial passage of the fluid, the hood portion 108 further comprising a hood output end 112;
a tube coupling portion 118 for coupling the hood portion 108 to at least one tube 120, the tube coupling portion 118 being adjustable to join with differently sized and dimensioned tubes; and
a dispersion portion 126 for dispersing the fluid, the dispersion portion 126 comprising a dispersion grill 128 for directionally funneling the fluid during dispersion, the dispersion portion 126 further comprising a dispersion tube end 204 for attaching to a distal end 124 of the at least one tube 120, the dispersion portion 126 further comprising a dispersion coupling end 206 for attaching to at least one additional tube coupling portion 118 and at least one additional tube 120, the additional attachments being operable to expand a range of the evaporative cooler regulation system 100.

In one embodiment of the present invention, the evaporative cooler regulation system 100 is directed to fluid transfer. The fluid may include, without limitation, evaporated air, cool air, moist air, warm air, hot air, and a vapor. The evaporative cooler regulation system 100 couples to, directionally distributes, and allows access to controls in the evaporative cooler 102. The evaporative cooler regulation system 100 comprises adaptable connectors and tubes that couple to the evaporative cooler 102, as referenced in FIG. 1. The evaporative cooler 102 may include, without limitation, a wet air cooler, a swamp cooler, a desert cooler, an evaporative cooler tower, and a mist system. However, in other embodiments, additional cooling and heating systems may be utilized. The evaporative cooler regulation system 100 couples to the evaporative cooler 102 for regulating it and distributing the expelled fluid. In some embodiments, the evaporative cooler regulation system 100 includes at least one aperture 116 that provides access to a cooler control portion 106 on the evaporative cooler 102. The system 100 utilizes at least one tube 120 for carrying the fluid, with the capacity to expand to a multiplicity of flexible tubes to increase the dispersion range. The number and diameters of the at least one tube 120 may be expanded due to connectors between the tubes 120. The system 100 directionally disperses the fluid through a plurality of axial slots, or a dispersion grill 128, which may be oriented in a desired direction. Suitable materials for the evaporative cooler regulation system 100 may include, without limitation, molded acrylonitrile butadiene styrene, high density polymers, aluminum, cardboard, wood, and fiberglass.

In one embodiment, a hood portion 108 engages a discharge opening 104 of the evaporative cooler 102. The hood portion 108 is adaptable to provide a custom fit to an eclectic assortment of evaporative coolers 102. In one embodiment, the hood portion 108 comprises a substantially rectangular shape, and dimensions of 18"×24". However, in other embodiments, the hood portion 108 may be sized larger or smaller, depending on the size of the evaporative cooler 102. The hood portion 108 also provides numerous functions for the evaporative cooler regulation system 100. In some embodiments, the hood portion 108 comprises a hood mounting end 110 that forms a seal with the discharge opening 104 of the evaporative cooler 102. The seal helps restrict fluid loss at the junction between the surfaces. The seal may include, without limitation, a rubber gasket, an insulator, an adhesive, a magnet, and a fastener. In one embodiment, the hood portion 108 comprises a flange for attaching to the evaporative cooler 102. The flange is configured to at least partially enter slots in the discharge opening 104 and form the seal.

In some embodiments, the hood portion 108 comprises at least one aperture 116 for regulating access to the evaporative cooler 102, the cooler control portion 106, and the fluid. The at least one aperture 116 may be sufficiently sized and dimensioned to allow a user to access and manipulate the cooler control portion 106. In one embodiment, the at least one aperture 116 is a square opening, sufficiently sized for a hand to pass through. The cooler control portion 106 may include, without limitation, a power regulator, a temperature regulator, and a fan speed regulator. However, in other embodiments, the cooler control portion 106 may include various switches and mechanisms for controlling and performing maintenance on the evaporative cooler 102. The at least one aperture 116 may further allow for simple maintenance of the evaporative cooler 102 without having to detach the hood portion 108. Additionally, the at least one aperture 116 may be configured to close and open through a sliding barrier. However, in other embodiments, different barriers may be utilized, including, without limitation, a hinged door, a detachable door, and a transparent barrier. The at least one aperture 116 may then be operable to enable at least partial dispersion of the fluid for cooling the ambient air. In this manner, the fluid may disperse in proximity to the evaporative cooler 102. The hood portion 108 may further include a hood output end 112 for attaching to other components so that the system 100 may be expanded further.

The hood output end 112 joins with a tube coupling portion 118, which is sized and dimensioned to couple to the at least one tube 120. In one embodiment, the hood output end 112 may include a circular dimension that mates with the tube coupling portion 118. The tube coupling portion 118 includes screws to tighten the grip around the hood output end 112. The tube coupling portion 118 may have a flat surface and a substantially similar diameter to the hood output end 112. The tube coupling portion 118 comprises at least one tab 202. The at least one tab 202 is configured to at least partially enter at least one slot 114 in the hood output end 112 to form a secure attachment between them. The ends of the tube coupling portion 118 may not be sized the same, since the tube coupling portion 118 may serve as an adapter between differently sized circumferences of the hood output end 112 and the at least one tube 120.

At least one tube 120 joins with the tube coupling portion 118. The at least one tube 120 may include, without limitation, a flexible aluminum duct tube, an air conditioner duct, a polyvinyl chloride (PVC) pipe, and a pipe, tube, or canal that carries air or liquid from one place to another. The at least one tube 120 includes a proximal end 122 for attaching to the tube coupling portion 118. The at least one tube 120 may include a 10" diameter configured to join and form a seal with the tube coupling portion 118. The at least one tube 120 may utilize a series of tubes joined together, and tapering into a gradually decreasing diameter. In this manner, the speed of the fluid is increased. Conversely, increasing the diameter of the series of tubes 120 is efficacious for reducing the speed of the fluid. The flexible construction of the at least one tube 120 allows for fluid distribution to be regulated more efficiently. For example, without limitation, the fluid may be directed towards a first room during the morning and a second room during the evening. An insulator may position between the at least one tube 120 and the tube coupling portion 118 to help restrict the loss of cool fluid from the junction. The at least one tube 120 may be supplied by the user or be obtained off the shelf, since the system 100 is adaptable to join with an eclectic sizes and styles of tubes 120 and evaporation coolers 102. The at least one tube 120 further includes a distal end 124 for either dispersing the fluid, or joining with additional components.

In some embodiments, a dispersion portion 126 couples to the distal end 124 of the at least one tube 120 (FIGS. 2A and 2B). The dispersion portion 126 serves to directionally disperse the fluid and additionally, couple two tubes 120 together, if required. The dispersion portion 126 includes a substantially L-shape that forms a rigid, terminal end for the distal end 124 of the at least one tube 120. The substantially L-shape comprises a longitudinal portion 130 that positions along the longitudinal axis of the at least one tube 120, and an end portion 132 that rests across the face of the distal end 124. A flange extends form the end portion 132. The flange can be circular and sized to mate with the distal end 124 to form a fluid-tight seal. The dispersion portion 126 further comprises a dispersion grill 128 for directionally dispersing the fluid. The dispersion grill 128 pivotally adjusts to direct the fluid towards multiple directions along a cross section of the distal end 124. The dispersion portion 126 further comprises at least one attachment slot that is configured to receive and secure to an additional tube coupling portion 118 and tube. In this manner, a series of tubes can join together to extend the distribution range of the system 100. Suitable materials for the dispersion portion 126 may include, without limitation, molded acrylonitrile butadiene styrene, high density polymers, aluminum, cardboard, wood, and fiberglass.

In one embodiment of the present invention, an evaporative cooler regulation method 300 provides a process for distributing and regulating the fluid from an evaporative cooler 102 in a first area to a dispersion portion 126 in a second area, as referenced in FIG. 3. The evaporative cooler regulation method 300 comprises an initial Step 302 of positioning the evaporative cooler 102 to disperse the fluid from the first area to the second area. The evaporative cooler 102 generates evaporated, moist air. Those skilled in the art will recognize that the evaporative cooler 102 is different than a standard air conditioner that circulates a refrigerant liquid as air passes over. The evaporative cooler 102 utilizes a constant source of water, which evaporates in response to warm ambient air passing over. The evaporative cooler 102 may include, without limitation, a wet air cooler, a swamp cooler, a desert cooler, an evaporative cooler tower, and a mist system.

The method 300 may then proceed to a next Step 304, which includes joining the hood portion 108 with the evaporative cooler 102. The hood portion 108 forms a seal with the evaporative cooler 102 to restrict fluid loss. The hood portion 108 engages a discharge opening 104 of the evaporative cooler 102. The hood portion 108 is adaptable to provide a custom fit to an eclectic assortment of evaporative coolers 102. In some embodiments, a next Step 306 includes orienting at least one aperture 116 in the hood portion 108 to an open position. The at least one aperture 116 may be configured to close and open through a sliding barrier. A subsequent Step 308 comprises accessing a cooler control portion 106 through the at least one aperture 116 to regulate the fluid. The at least one aperture 116 may be sufficiently sized and dimensioned to allow a user to access and manipulate the cooler control portion 106. The cooler control portion 106 may include, without limitation, a power regulator, a temperature regulator, and a fan speed regulator. Next, a Step 310 includes enabling at least partial dispersion of the fluid through the at least one aperture 116. The at least one aperture 116 is operable to enable at least partial dispersion of the fluid for cooling the ambient air. In this manner, the fluid disperses in proximity to the evaporative cooler 102.

In one embodiment, a Step 312 comprises coupling a tube coupling portion 118 to the hood portion 108. The hood output end 112 joins with a tube coupling portion 118, which is sized and dimensioned to couple to the at least one tube 120. The tube coupling portion 118 may have a flat surface and a substantially similar diameter to the hood output end 112. The tube coupling portion 118 comprises at least one tab 202. The at least one tab 202 is configured to at least partially enter at least one slot 114 in the hood output end 112 to form a secure attachment between them. The method 300 then proceeds with a Step 314 of coupling at least one tube 120 to the tube coupling portion 118. The ends of the tube coupling portion 118 may not be sized the same, as the tube coupling portion 118 may serve as an adapter between differently sized circumferences of the hood output end 112 and the at least one tube 120.

A next Step 316 comprises attaching the at least one tube 120 to a dispersion portion 126. The dispersion portion 126 couples to the distal end 124 of the at least one tube 120. The dispersion portion 126 serves to directionally disperse the fluid and additionally, couple two tubes 120 together, if required. The dispersion portion 126 includes a substantially L-shape that forms a rigid, terminal end for the distal end 124 of the at least one tube 120. The substantially L-shape comprises a longitudinal portion 130 that positions along the longitudinal axis of the at least one tube 120, and an end portion 132 that rests across the face of the distal end 124. A flange extends form the end portion 132. The flange can be circular and sized to mate with the distal end 124 to form a fluid-tight seal.

A Step 318 includes directionally regulating the fluid dispersion with a dispersion grill 128. The dispersion grill 128 pivotally adjusts to direct the fluid towards multiple directions along a cross section of the distal end 124. A final Step 320 entails attaching at least one additional tube coupling portion 118 and at least one additional tube 120 to the dispersion portion 126 to form a series of tubes 120. The dispersion portion 126 further comprises at least one attachment slot that is configured to receive and secure to an additional tube coupling portion 118 and tube 120. In this manner, a series of tubes 120 can join together to extend the distribution range of the system 100. In one embodiment, the series of tubes 120 taper down into a gradually decreasing diameter. In this manner, the speed of the fluid is increased. Conversely, increasing the diameter of the series of tubes 120 is efficacious for reducing the speed of the fluid flow.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An evaporative cooler regulation system for regulating and distributing a fluid from an evaporative cooler, the evaporative cooler regulation system consisting of:

a hood portion for attaching to the evaporative cooler, the evaporation cooler comprising a swamp cooler, the swamp cooler comprising an input opening for receiving warm air from a first area and a discharge opening for discharging cool air into a second area, the hood portion comprising a substantially rectangular shape having dimensions of 18 inches by 24 inches, the hood portion further comprising a hood mounting end for mating with the discharge opening, the hood portion further comprising at least one aperture, the at least one aperture being configured to enable access to a cooler control portion, the cooler control portion being operable to regulate a fluid dispersion, the cooler control portion comprising a power regulator and/or a temperature regulator and/or a fan speed regulator, the at least one aperture further being configured to enable at least partial passage of the fluid, the fluid comprising evaporated air, the hood portion further comprising a hood output end;

a tube coupling portion for coupling the hood portion to at least one tube, the at least one tube comprising a flexible air duct, the tube coupling portion being adjustable to join with differently sized and dimensioned tubes, the tube coupling portion comprising at least one tab for engaging the hood output end, the at least one tab being configured to at least partially enter at least one slot in the hood output end, the tube coupling portion further comprising a molded acrylonitrile butadiene styrene material; and a dispersion portion for dispersing the fluid, the dispersion portion comprising a substantially L-shape, the L-shape comprising a longitudinal portion and an end portion, the longitudinal portion comprising a length of 8 inches, the end portion comprising a length of 12 inches, the dispersion portion further comprising a dispersion grill for directionally funneling the fluid during dispersion, the dispersion portion further comprising a dispersion tube end for attaching to a distal end of the at least one tube, the dispersion portion further comprising a dispersion coupling end for attaching to at least one additional tube coupling portion and at least one additional tube, the additional attachments being operable to expand a range of the evaporative cooler regulation system.

* * * * *